United States Patent
Liu et al.

(10) Patent No.: US 9,465,542 B2
(45) Date of Patent: Oct. 11, 2016

(54) STORAGE MANAGEMENT SYSTEM, MANAGEMENT DEVICE AND METHOD THEREFOR

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Yao-Hua Liu, Shenzhen (CN); Xin Lu, Shenzhen (CN); Huan-Huan Zhang, Shenzhen (CN); Yu-Yong Zhang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 13 days.

(21) Appl. No.: 14/677,455

(22) Filed: Apr. 2, 2015

(65) Prior Publication Data

US 2016/0132254 A1 May 12, 2016

(30) Foreign Application Priority Data

Nov. 12, 2014 (CN) .......................... 2014 1 0633998

(51) Int. Cl.
*G06F 3/00* (2006.01)
*G06F 3/06* (2006.01)

(52) U.S. Cl.
CPC ........... *G06F 3/0608* (2013.01); *G06F 3/0619* (2013.01); *G06F 3/0665* (2013.01); *G06F 3/0689* (2013.01)

(58) Field of Classification Search
None
See application file for complete search history.

(56) References Cited

U.S. PATENT DOCUMENTS

| | | | |
|---|---|---|---|
| 2004/0236897 A1* | 11/2004 | Cheng .................. | G06F 3/0608 711/103 |
| 2010/0228931 A1* | 9/2010 | Mikami ................ | G06F 3/0625 711/154 |
| 2014/0164699 A1* | 6/2014 | Resch ................... | G06F 12/023 711/114 |

* cited by examiner

*Primary Examiner* — David X Yi
*Assistant Examiner* — Craig Goldschmidt
(74) *Attorney, Agent, or Firm* — Zhigang Ma

(57) ABSTRACT

A storage management method, includes steps: detecting sizes of shared storage spaces of all terminal devices joined in a sharing system; dividing the all terminal devices into a number of device groups randomly; classifying the terminal devices of each group into a number of kinds of terminal devices according to the sizes of the shared storage spaces of the terminal devices of each device group; mapping the shared storage spaces of each kind of terminal device of each device group to one corresponding virtual disk of one row of a virtual disk array card; and determining a size of a file to be stored when receiving a storing request, and selecting a virtual disk with size nearest to and greater than or equal to that of the file from one row randomly, and storing the file into the terminal devices mapping to the selected virtual disk.

17 Claims, 4 Drawing Sheets

US 9,465,542 B2

STORAGE MANAGEMENT SYSTEM, MANAGEMENT DEVICE AND METHOD THEREFOR

CROSS-REFERENCE TO RELATED APPLICATION

This application claims priority to Chinese Patent Application No. 201410633998.9 filed on Nov. 12, 2014, the contents of which are incorporated by reference herein.

FIELD

The subject matter herein generally relates to management systems, and particularly to a storage management system, a storage management device, and a storage management method.

BACKGROUND

Nowadays, portable devices, such as mobile phones, tablet computers are popular. When a user regularly uses one portable device, the storage capacity of the portable device cannot satisfy the storing requirement of the regularly input data.

BRIEF DESCRIPTION OF THE DRAWINGS

Implementations of the present technology will now be described, by way of example only, with reference to the attached figures.

DETAILED DESCRIPTION

Figure 1:
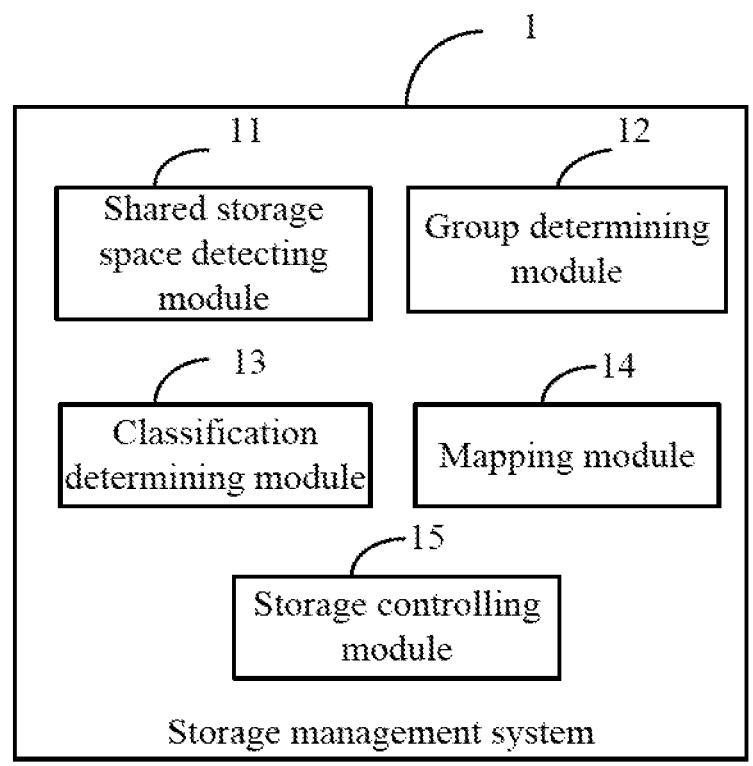
FIG. 1 is a block diagram of a storage management system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented. The term "module" refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series and the like. The connection can be such that the objects are permanently connected or releasably connected.

Figure 2:
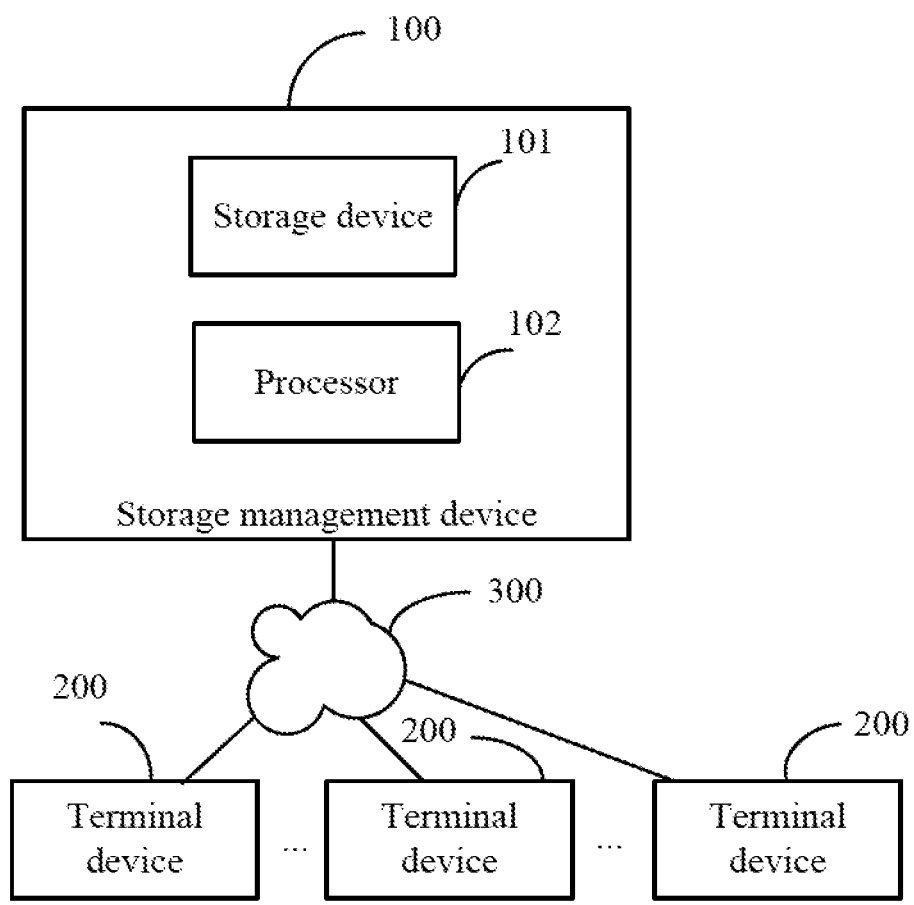
FIG. 2 is a diagrammatic view of a storage management device and a number of terminal devices connected to the storage management device.

FIGS. 1 and 2 illustrate a storage management system 1 (shown in FIG. 1). The storage management system 1 is installed in a storage management device 100 as shown in FIG. 2 and is run by the storage management device 100. The storage management device 100 is connected to a number of terminal devices 200 via the network 300 by wired mode or wireless mode.

The storage management device 100 includes a storage device 101 and a processor 102. The terminal devices 200 can be tablet computers, mobile phones, workstation computers, or personal computers including desktop computers and portable computers. The storage management device 100 can be a server or a server group. The network 300 can be Internet, a wireless network including WIFI® and BLUETOOTH®, a telecommunication network including a general packet radio service (GPRS) network and a code division multiple access (CDMA) network, or a broadcasting network.

Figure 3:
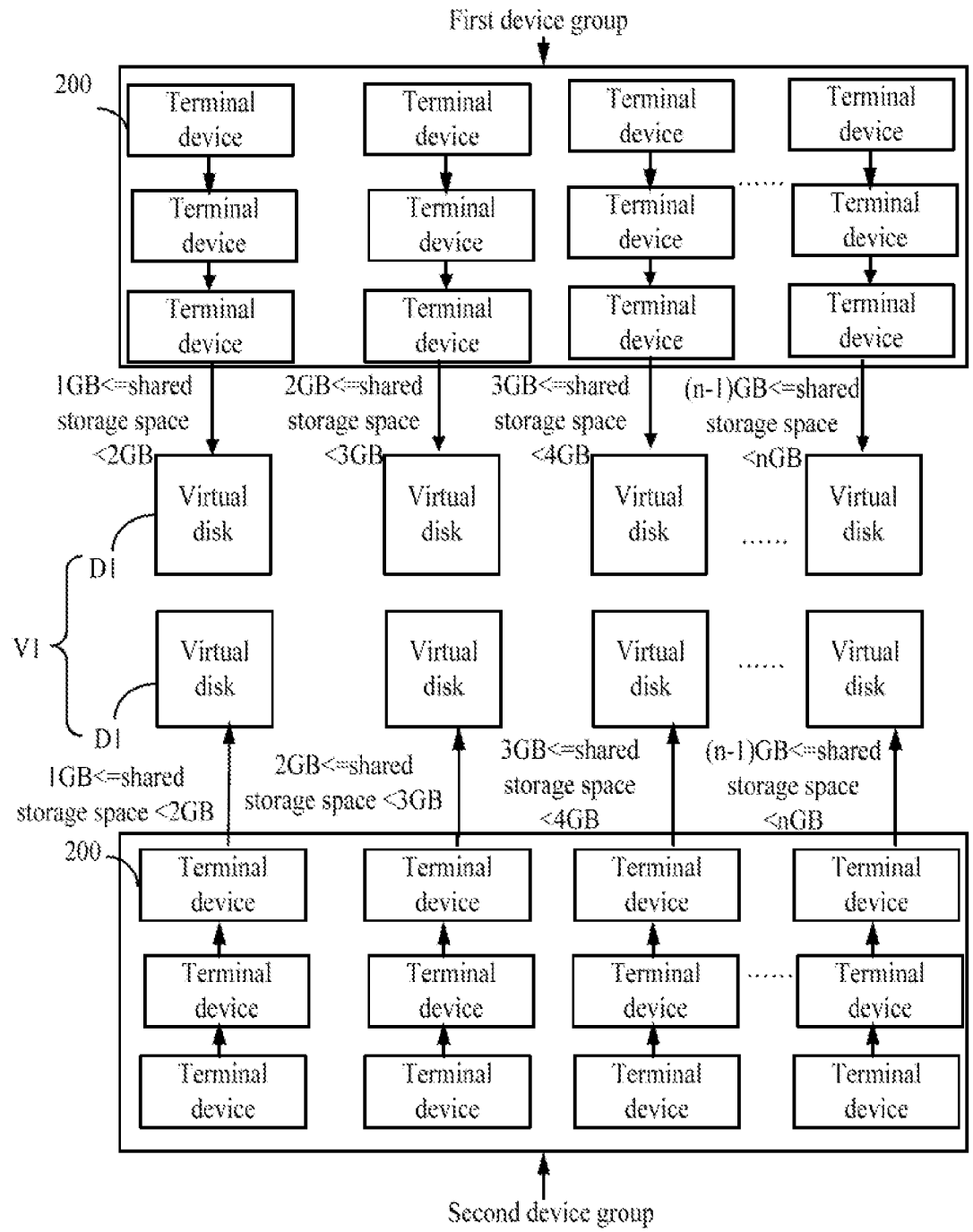
FIG. 3 is a diagrammatic view showing mapping relationships between a virtual disk array card and a number of terminal devices.

FIG. 3 illustrates the storage device 101 stores a virtual disk array card V1, the virtual disk array card V1 includes a number of virtual disks D1 with different storage capacities. In detail, the number of virtual disks D1 are arranged in a multi-row and multi-column matrix pattern, each row of virtual disks D1 includes a number of virtual disks D1 with different storage capacities. For example, each row of virtual disks D1 includes a virtual disk D1 with 1 gigabits (GB), a virtual disk D1 with 2 GB, a virtual disk D1 with 3 GB, and so on.

The storage management system 1 can map shared storage spaces of the number of terminal devices 200 to the virtual disk array card V1, and can store a large size file to other terminal devices with the shared storage spaces in response to a storing request for storing the large size file to cloud from one terminal device.

FIG. 1 illustrates the storage management system 1 includes a shared storage space detecting module 11, a group determining module 12, a classification determining module 13, a mapping module 14, and a storage controlling module 15. The modules of the storage management system 1 can be a collection of software instructions stored in the storage device 101 and executed by the processor 102, or can include functionality represented as hardware or integrated circuits, or as software and hardware combinations, such as a special-purpose processor or a general-purpose processor with special-purpose firmware.

In at least one embodiment, the processor 102 can be a central processing unit, a digital signal processor, or a single chip, for example. In at least one embodiment, the storage device 101 can be an internal storage system, such as a flash memory, a random access memory (RAM) for temporary storage of information, and/or a read-only memory (ROM) for permanent storage of information. The storage device 101 can also be a storage system, such as a hard disk, a storage card, or a data storage medium. The storage device 101 can include volatile and/or non-volatile storage devices. In at least one embodiment, the storage device 101 can include two or more storage devices such that one storage device is a memory and the other storage device is a hard drive. Additionally, one or more of the storage devices 101 can be located either entirely or partially external relative to the storage management device 100.

The shared storage space detecting module 11 is used to detect sizes of the shared storage spaces of the terminal devices 200 joined in a sharing system. In the embodiment, the terminal devices 200 joined in the sharing system are the terminal devices 200 registering in the storage management device 100 and providing the shared storage spaces. The shared storage space detecting module 11 detects the sizes of the shared storage space of one terminal device 200 after the terminal device 200 has registered in the storage management device 100, and detects the size of shared storage space of the terminal device 200 in real time when the terminal device 200 connects to the storage management device 100.

In one embodiment, the shared storage space of each terminal device 200 can be an idle storage space of the terminal device 200. In another embodiment, the shared storage space of each terminal device 200 can be a storage space predefined by a user of the terminal device 200. For example, if the idle storage space of the terminal device 200 is 10 GB, the user of the terminal device 200 can define 5 GB as the shared storage space and thus other terminal devices 200 can store data to the 5 GB shared storage space. The registered terminal devices 200 can connect to the storage management device 100 via the network 300, thus providing the shared storage space for other terminal devices 200 joined in the sharing system, and can store files to cloud, namely shared storage spaces of other terminal devices 200 joined in the sharing system.

The group determining module 12 is used to divide all terminal devices joining the sharing system into a number of device groups randomly. In one embodiment, the group determining module 12 randomly selects a predetermined number (such as 100) of terminal devices 200 as one device group, thus determining the number of device groups including the predetermined number of terminal devices 200. In another embodiment, the group determining module 12 randomly selects one terminal device 200 at intervals, and calculates a total size of the shared storage space of all of the selected terminal devices 200 each time when selecting one terminal device 200, and determines currently selected terminal devices 200 as one device group when the total size of the shared storage spaces of the selected terminal devices 200 is equal to a predetermined value (such as 1000 GB).

The classification determining module 13 is used to classify the terminal devices of each device group of terminal devices 200 to different kinds of terminal devices 200 according to the size of the shared storage space of each terminal device 200 of the device group. Each kind of terminal device 200 has a corresponding storage capacity. For example, the classification determining module 13 classifies the terminal devices 200 whose sizes of the shared storage spaces are greater than or equal to 1 GB and less than 2 GB as a first kind of terminal device 200 with 1 GB storage capacity, and classifies the terminal devices 200 whose shared storage spaces are greater than or equal to 2 GB and less than 3 GB as a second kind of terminal device 200 with 2 GB storage capacity, and classifies the terminal devices 200 whose shared storage spaces are greater than or equal to 3 GB and less than 4 GB as a third kind of terminal device 200 with 3 GB storage capacity, etc. In the embodiment, the classification determining module 13 reclassifies the terminal device 200 when the size of the shared storage space of the terminal device 200 is changed. In the embodiment, a difference between two adjacent kinds of terminal devices 200 is 1 GB, in other embodiments, the difference between two adjacent kinds of terminal devices 200 can be 0.5 GB, 2 GB, 3 GB, etc.

FIG. 3 illustrates the mapping module 14 is used to map the shared storage spaces of each kind of terminal device 200 of each device group to virtual disks D1 with corresponding storage capacities of each row of the virtual disk array card V1 one by one. In detail, each device group is mapped to one of the rows of the virtual disk array card V1, and each kind of terminal device 200 of one device group is mapped to one corresponding virtual disk D1 with corresponding storage capacity of the corresponding row. In more detail, the mapping module 14 links the shared storage spaces of each kind of terminal device 200 of each device group to form a number of corresponding storage space chains, and respectively maps storage space chains of each device group to virtual disks D1 with the corresponding storage capacities of the corresponding row. For example, assuming there are two device groups divided by the group determining module 12, the mapping module 14 links the shared storage spaces of the terminal devices 200, which are classified as the first kind of terminal device 200 with 1 GB storage capacity of a first device group, to form a storage space chain, and maps the storage space chain to the virtual disk D1 with 1 GB storage capacity of a first row of the virtual disk array card V1. The mapping module 14 then links the shared storage spaces of the terminal devices 200, which are classified as the second kind of terminal device 200 with 2 GB storage capacity, to form another storage space chain, and maps the storage space chain to the virtual disk D1 with 2 GB storage capacity of the first row of the virtual disk array card V1, until the shared storage spaces of all kinds of terminal devices 200 of the first device group are mapped to the corresponding virtual disks D1 of the first row of the virtual disk array card V1.

Similarly, the mapping module 14 links the shared storage spaces of the terminal devices 200, which are classified as the first kind of terminal device 200 with 1 GB storage capacity of a second device group, to form a storage space chain, and maps the storage space chain to the virtual disk D1 with 1 GB storage capacity of a second row of the virtual disk array card V1. The mapping module 14 then links the shared storage spaces of the terminal devices 200, which are classified as the second kind of terminal device 200 with 2 GB storage capacity, to form another storage space chain, and maps the storage space chain to the virtual disk D1 with 2 GB storage capacity of the second row of the virtual disk array card V1, until the shared storage spaces of all kinds of terminal devices 200 of the second device group are mapped to the corresponding virtual disks D1 of the second row of the virtual disk array card V1.

In another embodiment, the mapping module 14 does not link the shared storage spaces of each kind of terminal device 200 to form the storage space chain but directly maps the shared storage spaces of one kind of the terminal devices 200 to the corresponding virtual disk D1 of the corresponding row of the virtual disk array card V1.

In one embodiment, the mapping module 14 is further used to pre-establish the virtual disk array card V1 in response to user operation and store the virtual disk array card V1 to the storage device 101. The virtual disk D1 of the virtual disk array card V1 are in a format of redundant array of inexpensive disks.

The storage controlling module 15 is used to receive a storing request for storing a file to cloud from one terminal device 200, and determine a size of the file to be stored (here in after called the file) according to the storing request, and randomly select one virtual disk D1 whose storage capacity is nearest and greater than or equal to the size of the file from one row of the virtual disk array card V1, and stores the file to the shared storage spaces of the terminal devices 200 mapping to the selected virtual disk D1, namely the kind of the terminal devices mapping to the selected virtual disk D1.

For example, assume the size of the file to be stored is 1.8 GB, thus the virtual disk D1 whose storage capacity is nearest and greater or equal to the size of the file is the virtual disk D1 with 2 GB, the storage controlling module 15 randomly selects one virtual disk D1 with 2 GB from one row of the virtual disk array card V1, and stores the file to the shared storage space of the terminal devices 200 mapping to the selected virtual disk D1 with 2 GB.

In the embodiment, the storing request can be generated and transmitted to the storage management device 100 in response to an operation of selecting a corresponding menu item when the user needs to store one file to the cloud, the storing request includes size information of the file to be stored.

In one embodiment, when the mapping module 14 maps the shared storage space of one terminal device 200 to one virtual disk D1, the mapping module 14 associates a communication address (such as an internet protocol address, a hardware address) of the terminal device 200 with the virtual disk D1, and stores the communication address of the terminal device 200 to the storage device 101. The storage controlling module 15 stores the file to the shared storage spaces of the terminal devices 200 mapping to the selected virtual disk D1 as follows: the storage controlling module 15 determines the communication addresses of the terminal devices 200 mapping to the selected virtual disk D1, and stores the file to the shared storage spaces of the terminal devices 200 according to the communication addresses of the terminal devices 200.

Therefore, according to the present disclosure, the user of one terminal device 200 can store files to other terminal devices 200. Besides, because the files are stored to a number of terminal devices 200, thus enabling that at least one terminal device 200 is connected to the storage management device 100 and the file is available when needed. Furthermore, because the terminal devices 200 are divided into a number of groups, and the file only stored to the terminal devices of one device group, thus avoiding occupation of the storage space of all of the terminal devices 200 joined in the shared system.

Figure 4:
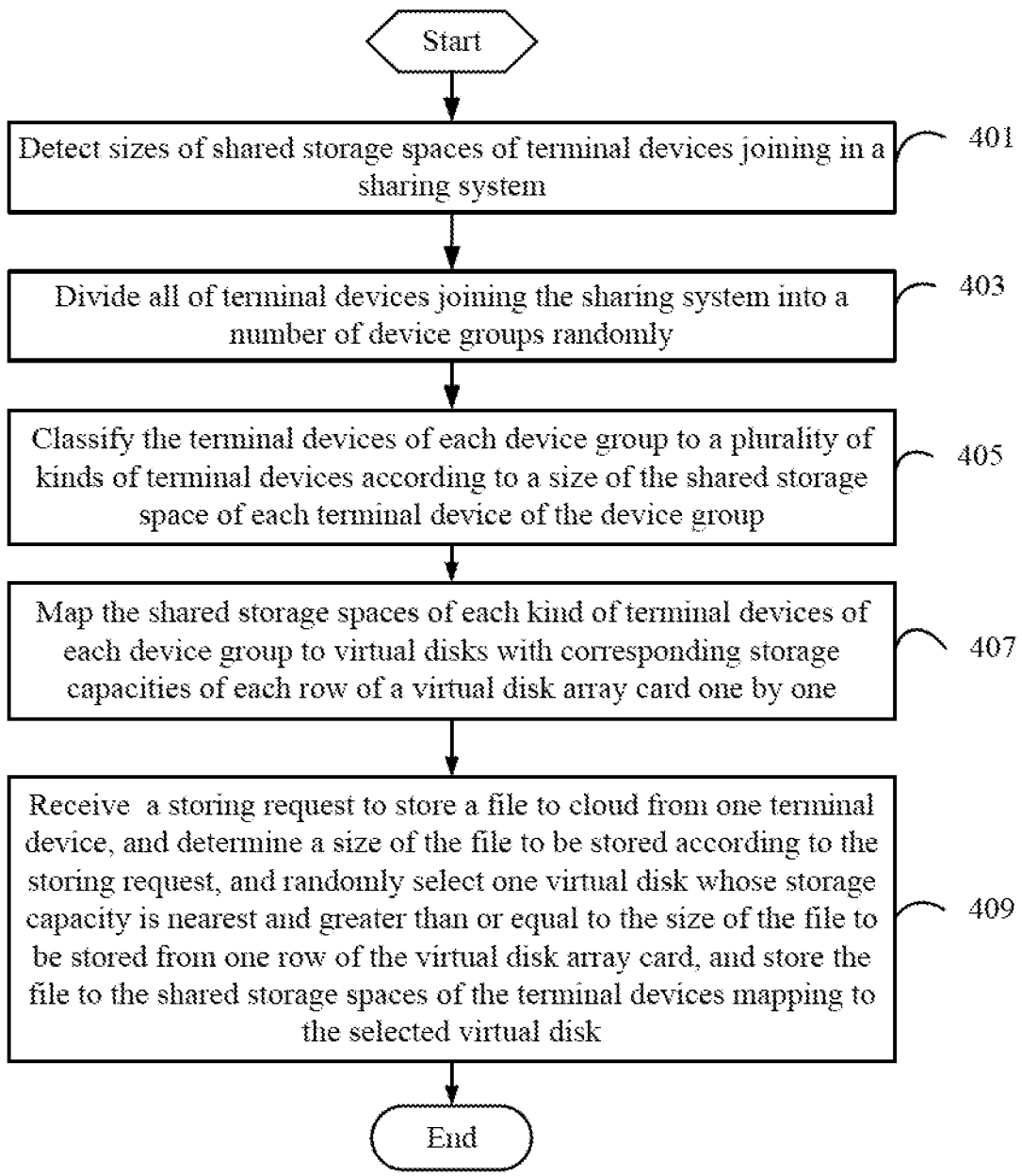
FIG. 4 is a flowchart illustrating a storage management method.

FIG. 4 illustrates a flowchart of a storage management method. The method is provided by way of example, as there are a variety of ways to carry out the method. The method described below can be carried out using the configurations illustrated in FIG. 1, for example, and various elements of these figures are referenced in explaining the example method. Each block shown in FIG. 4 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 401.

At block 401, a shared storage space detecting module detects sizes of shared storage spaces of terminal devices joined in a sharing system. In the embodiment, the terminal devices joined in the sharing system are the terminal devices registered in a storage management device and providing the shared storage spaces. The shared storage space detecting module detects the sizes of the shared space of one terminal device after the terminal device has registered in the storage management device, and detects the shared space of one terminal device in real time when the terminal device connects to the storage management device 100.

At block 403, a group determining module randomly divides all of terminal devices joining the sharing system into a number of device groups. In one embodiment, the group determining module randomly selects a predetermined number (such as 100) of terminal devices as one device group, thus determining the number of device groups each includes the predetermined number of terminal devices. In another embodiment, the group determining module randomly selects one terminal device at intervals, and calculates a total size of the shared storage space of all of the selected terminal devices each time when selecting one terminal device and determines currently selected terminal devices as one device group when the total size of the shared storage spaces of the selected terminal devices is equal to a predetermined value.

At block 405, a classification determining module classifies the terminal devices of each device group to a number of different kinds of terminal devices according to a size of the shared storage space of each terminal device of the device group, each kind of terminal device has a corresponding storage capacity.

At block 407, a mapping module maps the shared storage spaces of each kind of terminal device of each device group to virtual disks D1 with corresponding storage capacities of each row of the virtual disk array card V1 one by one. In detail, the mapping module 14 links the shared storage spaces of each kind of terminal device 200 of each device group to form a number of corresponding storage space chains, and respectively maps the storage space chains of each device group to virtual disks D1 with the corresponding storage capacities of the corresponding row.

At block 409, a storage controlling module receives a storing request to store a file to the cloud, and determines a size of the file to be stored according to the storing request, and randomly selects one virtual disk whose storage capacity is nearest and greater than or equal to the size of the file to be stored from one row of the virtual disk array card, and stores the file to the shared storage spaces of the terminal devices mapping to the selected virtual disk.

In one embodiment, the method further includes steps: the mapping module further pre-establishes the virtual disk array card in response to user operation and stores the virtual disk array card to the storage device, the virtual disk D1 of the virtual disk array card V1 are in a format of redundant array of inexpensive disks.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. A storage management system comprising:
   at least one processor; and
   a plurality of modules which are collections of instructions executable by the at least one processor, the modules comprising:
   a cloud storage comprising a plurality of terminal devices joined in a sharing system, wherein each terminal device comprises storage, and each terminal device designates a portion of its respective storage as a shared storage space for the sharing system;

a shared storage space detecting module configured to, upon execution by the at least one processor, cause the at least one processor to detect sizes of the shared storage spaces of the plurality of terminal devices;

a group determining module configured to, upon execution by the at least one processor, cause the at least one processor to divide all of the plurality of terminal devices into a plurality of device groups, according to a dividing algorithm;

a classification determining module configured to, upon execution by the at least one processor, cause the at least one processor to perform the following for each respective device group:

create a plurality of kinds of terminal device, wherein each kind of terminal device has a different respective shared storage size range;

classify each terminal device of the respective device group into one of the plurality of kinds of terminal device so that the shared storage size of the respective terminal device is within the shared storage size range of the respective kind of terminal device;

for each respective kind of terminal device, link the corresponding terminal devices to form a respective storage space chain;

a virtual disk array card comprising a plurality of rows, each row corresponding to a respective one of the device groups, and each row comprising a plurality of virtual disks;

a mapping module configured to, upon execution by the at least one processor, cause the at least one processor to, for each device group, map each respective storage space chain to a respective one of the virtual disks in the respective row of the virtual disk array card corresponding to the respective device group, wherein the respective virtual disk has a size equal to the respective storage space chain;

a storage controlling module configured to, upon execution by the at least one processor, cause the at least one processor to receive a storing request to store a file to the cloud storage from one terminal device, and determine a size of the file to be stored according to the storing request, select one of the rows of the virtual disk array card, and select one virtual disk of the row whose storage capacity is nearest and greater than or equal to the size of the file to be stored, and store the file to the shared storage spaces of the terminal devices mapping to the selected virtual disk.

2. The system according to claim 1, wherein the terminal devices joined in the sharing system are registered in a storage management device; wherein the shared storage space detecting module detects the shared storage space of one terminal device after the terminal device has registered in the storage management device.

3. The system according to claim 2, wherein the shared storage space of each terminal device is an idle storage space of the terminal device or a storage space predefined by a user of the terminal device.

4. The system according to claim 2, wherein the mapping module is further configured to, upon execution by the at least one processor, cause the at least one processor to pre-establish the virtual disk array card in response to user operation and the virtual disks of the virtual disk array card are in a format of redundant array of inexpensive disks.

5. The system according to claim 2, wherein the storing request is generated in response to an operation of selecting a corresponding menu item of the terminal device, wherein the storing request comprises size information of the file to be stored.

6. A storage management device comprising:

a storage device storing a virtual disk array card, wherein, the virtual disk array card comprises a plurality of virtual disks arranged in a multi-row and multi-column matrix pattern, each row of virtual disks includes a plurality of virtual disks with different storage capacities; and at least one processor configured to execute the plurality of modules, the plurality of modules comprising:

a cloud storage comprising a plurality of terminal devices joined in a sharing system, wherein each terminal device comprises storage, and each terminal device designates a portion of its respective storage as a shared storage space for the sharing system;

a shared storage space detecting module configured to, upon execution of the at least one processor, cause the at least one processor to detect sizes of the shared storage spaces of terminal devices;

a group determining module configured to, upon execution of the at least one processor, cause the at least one processor to divide all of terminal devices joined in the sharing system into a number of device groups, according to a dividing algorithm;

a classification determining module configured to, upon execution by the at least one processor, cause the at least one processor to perform the following for each respective device group;

create a plurality of kinds of terminal device, wherein each kind of terminal device has a different respective shared storage size range;

classify each terminal device of the respective device group into one of the plurality of kinds of terminal device so that the shared storage size of the respective terminal device is within the shared storage size range of the respective kind of terminal device;

for each respective kind of terminal device, link the corresponding terminal devices to form a respective storage space chain;

a mapping module configured to, upon execution by the at least one processor, cause the at least one processor to, for each device group, map the device group to a respective one of the rows of the virtual disk array card by mapping each respective storage space chain to a respective one of the virtual disks in the respective row of the virtual disk array card corresponding to the respective device group, wherein the respective virtual disk has a size equal to the respective storage space chain;

a storage controlling module configured to, upon execution by the at least one processor, cause the at least one processor to receive a storing request to store a file to the cloud storage from one terminal device, and determine a size of the file to be stored according to the storing request, select one of the rows of the virtual disk array card, and select one virtual disk of the row whose storage capacity is nearest and greater than or equal to the size of the file to be stored, and store the file to the shared storage spaces of the terminal devices mapping to the selected virtual disk.

7. The device according to claim 6, wherein the terminal devices joined in the sharing system are registered in a storage management device; wherein the shared storage space detecting module detects the shared storage space of one terminal device after the terminal device has registered in the storage management device.

8. The device according to claim 7, wherein the shared storage space of each terminal device is an idle storage space of the terminal device or a storage space predefined by a user of the terminal device.

9. The device according to claim 7, wherein the mapping module is further configured to pre-establish the virtual disk array card in response to user operation and the virtual disks of the virtual disk array card are in a format of redundant array of inexpensive disks.

10. The device according to claim 7, wherein the storing request is generated in response to an operation of selecting a corresponding menu item of the terminal device, wherein the storing request comprises size information of the file to be stored.

11. The device according to claim 7, wherein the group determining module dividing algorithm randomly selects a predetermined number of terminal devices as one device group such that the plurality of device groups each comprise the predetermined number of terminal devices.

12. The device according to claim 7, wherein the group determining module dividing algorithm randomly selects one terminal device at intervals, and calculates a total size of the shared storage space of all of the selected terminal devices each time when selecting one terminal device, and determines currently selected terminal devices as one device group when the total size of the shared storage spaces of the selected terminal devices is equal to a predetermined value.

13. A storage management method, applied in a storage management device, comprising:
    creating a cloud storage comprising a plurality of terminal devices joined in a sharing system, wherein each terminal device comprises storage, and each terminal device designates a portion of its respective storage as a shared storage space for the sharing system;
    detecting sizes of the shared storage spaces of terminal devices;
    dividing all of terminal devices joined in the sharing system into a plurality of device groups according to a dividing algorithm;
    creating a plurality of kinds of terminal device, wherein each kind of terminal device has a different respective shared storage size range;
    classifying each terminal device of the respective device group into one of the plurality of kinds of terminal device so that the shared storage size of the respective terminal device is within the shared storage size range of the respective kind of terminal device;
    for each respective kind of terminal device, linking the corresponding terminal devices to form a respective storage space chain;
    creating a virtual disk array card comprising a plurality of rows, each row corresponding to a respective one of the device groups, and each row comprising a plurality of virtual disks;
    for each device group, mapping each respective storage space chain to a respective one of the virtual disks in the respective row of the virtual disk array card corresponding to the respective device group, wherein the respective virtual disk has a size equal to the respective storage space chain;
    receiving a storing request to store a file to the cloud storage from one terminal device, and determining a size of the file to be stored according to the storing request, selecting one of the rows of the virtual disk array card, and selecting one virtual disk of the row whose storage capacity is nearest and greater than or equal to the size of the file to be stored, and storing the file to the shared storage spaces of the terminal devices mapping to the selected virtual disk.

14. The method according to claim 13, wherein the terminal devices joined in the sharing system are registered in a storage management device, wherein the step of detecting sizes of shared storage spaces of terminal devices joined in a sharing system comprises: detecting the sizes of the shared storage space of the terminal devices after the terminal devices have registered in the storage management device.

15. The method according to claim 14, wherein the shared storage space of each terminal device is an idle storage space of the terminal device or a storage space predefined by a user of the terminal device.

16. The method according to claim 14, further comprising:
    pre-establishing the virtual disk array card in response to user operation, wherein the virtual disks of the virtual disk array card are in a format of redundant array of inexpensive disks.

17. The method according to claim 14, further comprising:
    generating the storing request in response to an operation of selecting a corresponding menu item of the terminal device, the storing request comprising size information of the file to be stored.

* * * * *